United States Patent [19]

Sugiura et al.

[11] Patent Number: 5,140,441
[45] Date of Patent: Aug. 18, 1992

[54] MULTILEVEL-CODING APPARATUS AND MULTILEVEL-CODING METHOD USING AN OPTIMAL SIZED WINDOW BEGINNING FROM THE SMALLEST TO A LARGER SIZE

[75] Inventors: Susumu Sugiura, Atsugi; Shigetada Kobayashi, Yokohama, both of Japan

[73] Assignee: Canon Kabushiki Kaisha, Tokyo, Japan

[21] Appl. No.: 406,257

[22] Filed: Sep. 12, 1989

[30] Foreign Application Priority Data

Sep. 13, 1988 [JP] Japan ................. 63-227374

[51] Int. Cl.$^5$ ............................................. H04N 1/40
[52] U.S. Cl. .................... 358/456; 358/457; 358/429
[58] Field of Search ............ 358/429, 430, 455, 456, 358/457, 458, 461, 462, 465, 466, 267.1, 448, 443, 464, 467

[56] References Cited

U.S. PATENT DOCUMENTS

| | | | |
|---|---|---|---|
| 4,768,082 | 8/1988 | Hiratsuka et al. | 358/429 |
| 4,803,558 | 2/1989 | Hiratsuka et al. | 358/457 |
| 4,841,377 | 6/1989 | Hiratsuka et al. | 358/456 |

FOREIGN PATENT DOCUMENTS 62-117072   5/1987   Japan .

Primary Examiner—Edward L. Coles, Sr.
Assistant Examiner—Jerome Grant, II
Attorney, Agent, or Firm—Fitzpatrick, Cella, Harper & Scinto

[57] ABSTRACT

When image data binarized by a density-preserving type multilevel-coding method is to be recovered to multilevel image data, the size of a scanning window which includes as a central pixel point a pixel point to be subjected to multilevel coding is varied and the sums of data values of the binarized image data contained in the scanning windows corresponding to individual window sizes are sequentially calculated in the order of window size. If the sum of the binarized image data value reaches a predetermined threshold for each scanning window size, this window size is determined as a scanning window size for multilevel coding, and multilevel coding is executed. With this process, an optimum window size is determined which is suitable for use in effecting multilevel-coding with high image quality. Since multilevel coding employing the optimum window size is performed, multilevel coding with high image quality and high resolution is enabled.

10 Claims, 5 Drawing Sheets

MULTILEVEL-CODING APPARATUS AND MULTILEVEL-CODING METHOD USING AN OPTIMAL SIZED WINDOW BEGINNING FROM THE SMALLEST TO A LARGER SIZE

BACKGROUND OF THE INVENTION

1. Field of the Invention

The present invention relates generally to a multilevel-coding apparatus for recovering binarized image data to multilevel image data and a multilevel-coding method for use in such an apparatus.

2. Description of the Related Art

A conventional multilevel-coding method of recovering a binarized image to a multilevel image is disclosed in, for example, Japanese Patent Laid-Open No. 117072/1987.

The binarizing method used in such a multilevel-coding method is a dither method employing a fixed matrix. For this reason, even when binarized image data is recovered to multilevel image data, a binarized dither pattern is known in advance.

Accordingly, the size of the window recovered can be varied by again binarizing a recovered halftone image and matching it to the dither pattern.

However, in this dither method using such a fixed matrix, a high quality image is difficult to obtain and it is, therefore, impossible to avoid the problem that the image quality is inferior.

In such a situation, density-preserving type binarizing methods such as an error diffusion method, an average-error minimizing method and the like have recently received special attention as a binarizing method of improving the quality of a binarized image to produce a high-quality image.

The average-error minimizing method which is one of the density-preserving type binarizing methods is described in, for example, "Image from Computers", IEEE Spectrum 6, pages 66–78 (1969), M. R. Shroeder et al.

In general, the density-preserving type binarizing method differs from the dither method in that the matrix size is not fixed and adaptively varies in accordance with the state of shading of an image.

Accordingly, unlike the dither method using a fixed matrix which is disclosed in Japanese Patent Laid Open No. 17072/1987, in the density-preserving type binarizing method it is impossible to estimate a dither matrix which should be binarized in advance.

For this reason, in a case where an image which is binarized by the density-preserving type binarizing method is recovered to a multilevel image by means of a fixed window, if the size of the window is small, a reproduced image with good resolution is obtained, but a moiré may occur in a highlight portion of the reproduced image due to the printing pitch and the window size of the binarized image.

If the size of the window is made large, the moiré will become a pattern of a low-frequency wave or it may disappear, but the resolution will degrade to a remarkable extent. Accordingly, whether the window size is made large or small, a deterioration in image quality will result.

For this reason, if an image which is binarized by density-preserving type multilevel-coding method is to be recovered to a high-quality multilevel image, an optimum window size must be determined.

SUMMARY OF THE INVENTION

It is therefore an object of the present invention to provide a multilevel-coding apparatus and a multilevel-coding method both of which enable reproduction of a high-quality image.

It is another object of the present invention to provide a multilevel-coding apparatus and a multilevel-coding method both of which enable a high-quality image to be reproduced by means of a simple arrangement.

It is another object of the present invention to provide a method of recovering an image which has been binarized by a density-preserving type multilevel-coding method to a multilevel image with satisfactory quality by utilizing the features of a binarized image obtained by another method such as an error diffusion method.

It is another object of the present invention to provide a multilevel-coding apparatus and a multilevel-coding method both of which are capable of determining an optimum window size for a binarized image when an image which has been binarized by a density-preserving type multilevel-coding method is to be recovered to a high-quality multilevel image.

To achieve the above objects, in accordance with one aspect of the present invention, there is provided a multilevel-coding apparatus which comprises readout means for reading out the number of pixel points to be printed within a scanning window while changing the aperture size of the scanning window in a plurality of steps, a central one of the pixel points corresponding to an objective pixel point in binarized data; decision-making means for making a decision as to whether or not the number of pixel points to be printed within the window of each window size, which number is read out by the readout means, reaches a predetermined threshold specified by each of the windows; and window-size determining means for determining a window size to be subjected to multilevel coding on the basis of the result of the decision made by the decision-making means.

In accordance with another aspect of the present invention, there is provided a multilevel-coding method for use in an apparatus for recovering image data binarized by a density-preserving type multilevel-coding method to multilevel image data. This multilevel-coding method comprises the steps of varying the size of a scanning window which includes as a central pixel point an objective pixel point to be subjected to multilevel coding; and determining a window size to be subjected to multilevel coding on the basis of the sum of values of binarized image data within the scanning window.

With the above-described apparatus and method, it is possible to provide image data, binarized by a density-preserving type multilevel-coding method, which enables reproduction of a high-resolution image with a moiré suppressed in the highlight portion of the image.

BRIEF DESCRIPTION OF THE DRAWINGS

FIGS. 3 to 3(D) are views showing examples of images reproduced by a multilevel-coding method such as an error diffusion method or the like;

FIG. 6(B) is a view which serves to illustrate an example of a line drawing reproduced from data on a line drawing such as a character, a symbol or the like.

DETAILED DESCRIPTION OF THE INVENTION

The preferred embodiment of the present invention will be described in detail below with reference to the accompanying drawings.

Figure 1:
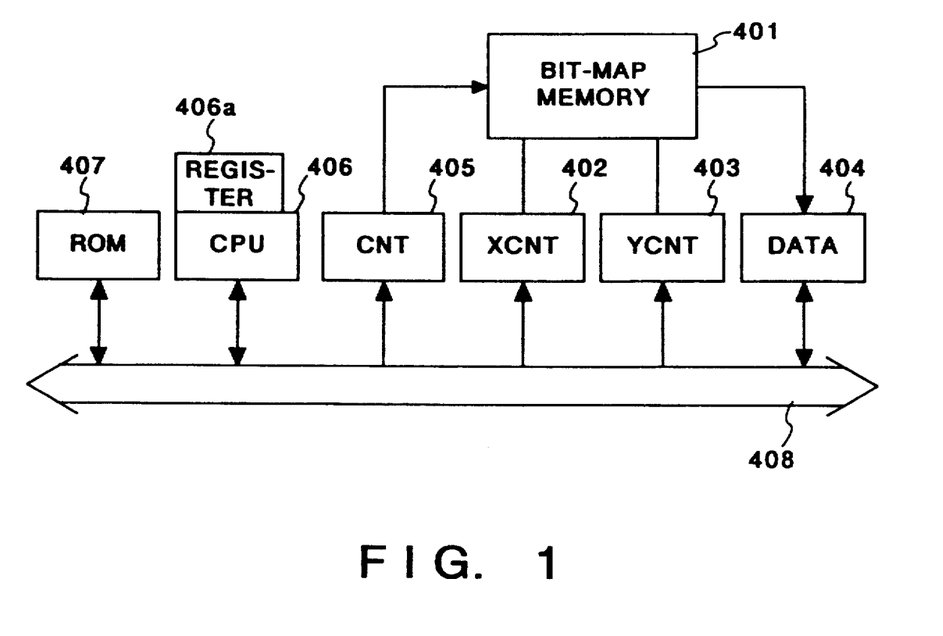
FIG. 1 is a block diagram of one embodiment of the present invention.

FIG. 1 is a block diagram showing a multilevel-coding apparatus for recovering image data which has been binarized by a density-preserving type multilevel-coding method to multilevel image data in accordance with the embodiment of the present invention.

Figure 4:
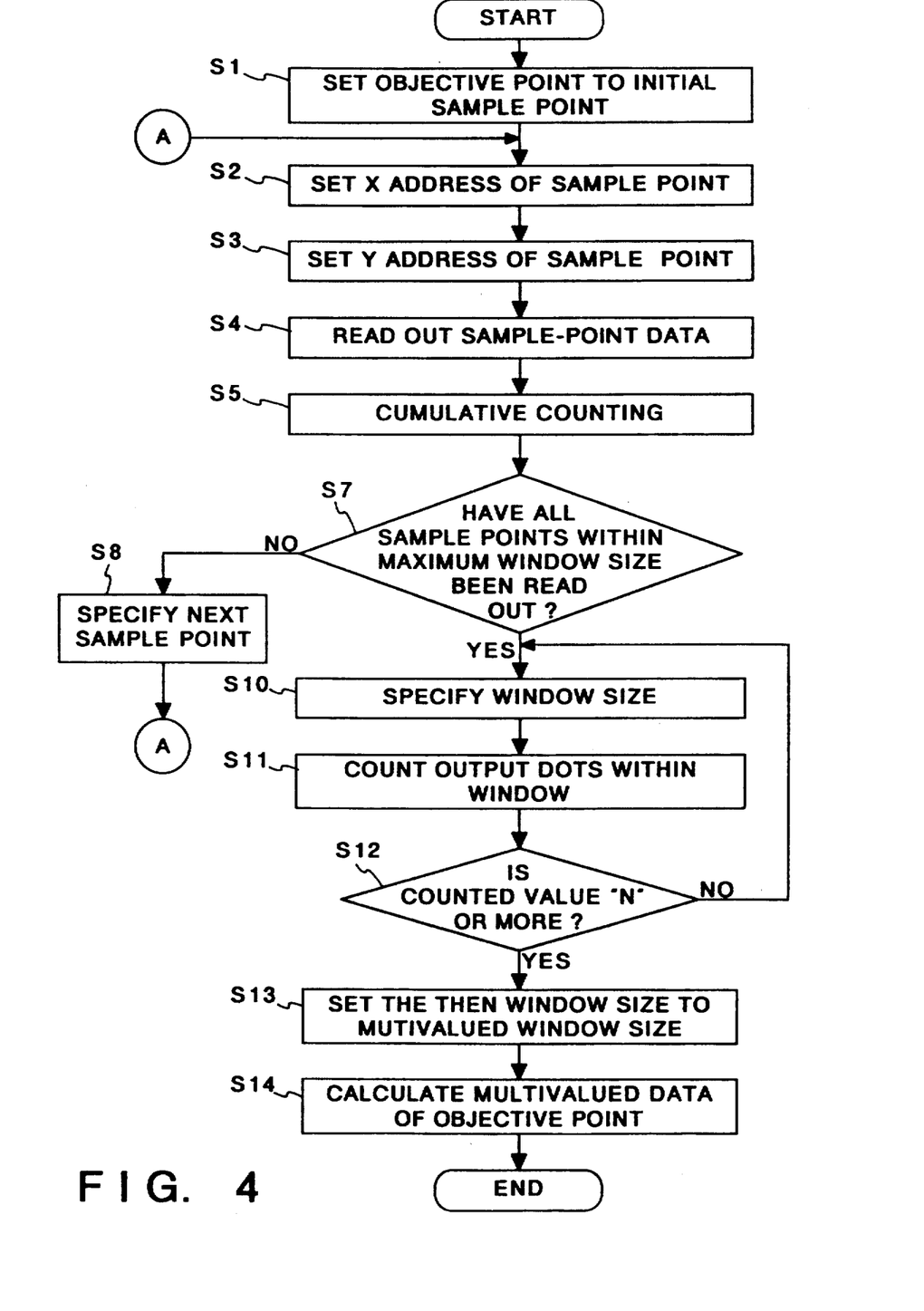
FIG. 4 is a flow chart showing the process of recovering binarized data to multilevel data in the embodiment of the present invention.

As shown in FIG. 1, the apparatus includes the following major elements: a bit-map memory 401, an X-axis counter 402 (hereinafter referred to simply as XCNT 402), a Y-axis counter 403 (hereinafter referred to simply as YCNT 403), a data-memory latch mechanism 404 (hereinafter referred to simply as DATA 404), a read/write control latch 405 (hereinafter referred to simply as CNT 401) for providing control over reading from and writing to the bit-map memory 401, a CPU 406 for providing control over the whole of the embodiment in accordance with the program shown in FIG. 4, which will be described later, a ROM 407 for storing, in addition to the above program, data such as parameters for use in the embodiment, and a bus line 408 for connecting individual elements.

Figure 2:
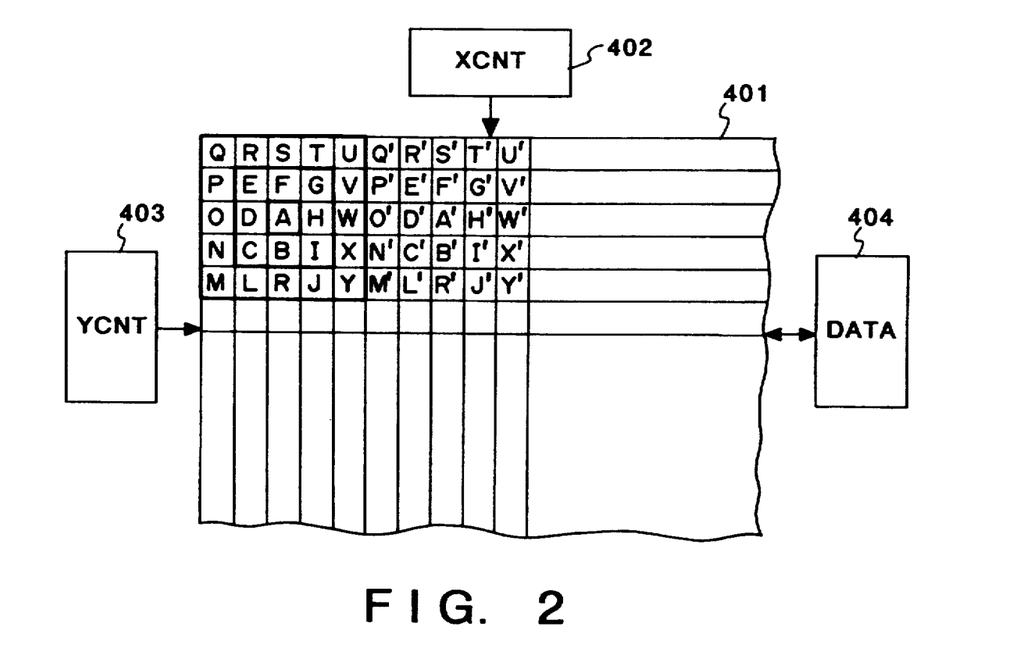
FIG. 2 is an enlarged diagrammatic view of a portion of the bit-map memory used in the embodiment of the present invention.

FIG. 2 is an enlarged diagrammatic view showing a portion of the bit-map memory 401.

In FIG. 2, "A" denotes a first objective pixel point (a sample point which is selected on the binarized image for the purpose of producing a multilevel image), and "B", "C", "D", ..., and "Y" represent pixels which may be positioned in the window which includes the first objective pixel point "A".

The positions of the respective pixels are primarily determined by the X-address data specified by XCNT 402 and the Y-address data specified by YCNT 403. The readout data is latched by DATA 404, and is then read into CPU 407 over the bus line 408.

The following is an explanation of a method of obtaining image data which is binarized by a density-preserving type multilevel-coding method utilizing the embodiment which comprises the above-described arrangement and construction.

FIGS. 3(A) to 3(D) show examples of images reproduced by a multilevel coding method such as an error diffusion method or the like.

Figure 3A:
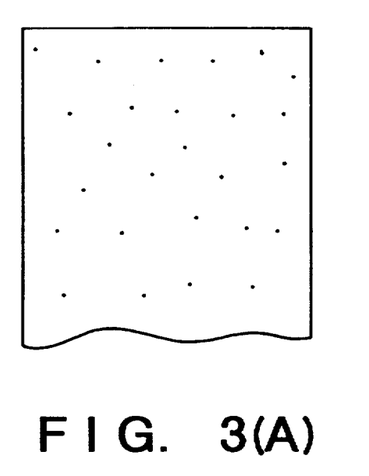
Figure 3B:
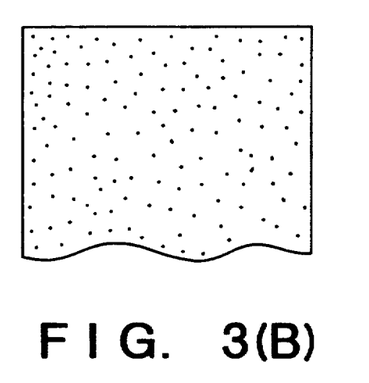
Figure 3C:
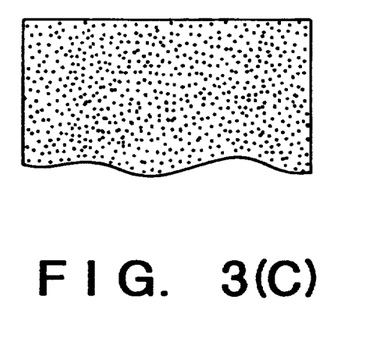

FIGS. 3(A) to 3(C) show halftone image portions, and the brightness of them becomes lower in the order FIG. 3(A) →FIG. 3(B)→FIG. 3(C).

Figure 3D:
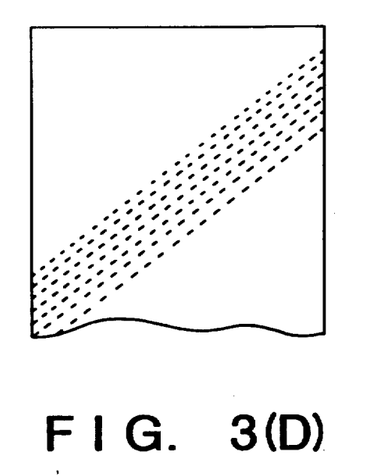

FIG. 3(D) shows an example of a thin-line image portion such as a part of a character, another symbol or the like.

As shown in FIG. 3(D), since the binarized image obtained by the error diffusion method or a similar multilevel-coding method utilizes a diffusion matrix, the distance between dots becomes relatively longer as the brightness increases.

Another feature of this binarized image is that dots are relatively concentrated in the thin-line image portion such as character, a symbol or the like.

In accordance with the preferred embodiment of the present invention, there are provided a multilevel-coding apparatus and a multilevel-coding method both of which are capable of recovering an image which has been binarized by a density-preserving type multilevel-coding method to a multilevel image with satisfactory quality by utilizing the features of the binarized image obtained by the error diffusion method or the like.

A method of effecting multilevel-coding on an objective pixel point binarized by a density-preserving type multilevel-coding method in accordance with the present embodiment, that is, a method of recovering an image binarized by the density-preserving type multilevel-coding method to a multilevel image with satisfactory quality, will be explained below with reference to the flow chart shown in FIG. 4.

First of all, in Step S1, CPU 406 specifies the first objective pixel point int he bit-map memory 401 (for example, the "A" point shown in FIG. 2). In the next step S2, CPU 406 sets in XCNT 402 the X-axis address of this sample point in the bit-map memory 401 which was specified in Step S2 and, in Step S3, sets the Y-address of the sample pint in YCNT 403. Subsequently, in Step S4, CPU 406 instructs CNT 405 to assume a memory-read mode, and CNT 405 gains access to the specified sample point, for example, the "A" point shown in FIG. 2, to read out corresponding binary data ("0" or "1"). This readout value is set in DATA 404 and is then transferred to CPU 406 over the bus line 408. In Step S5, CPU 406 stores this readout value in a register 406a thereof in a cumulative manner.

In Step S7, a decision is made as to whether all the sample points within the maximum window size, "Nmax" have been read out and the data thus read have been cumulatively stored in the register 406a of CPU 406. If it is determined that this operation has not yet been completed, the process proceeds to Step S8, where the next sample point is specified. Then, the process returns to Step S2.

In a similar manner, data on each pixel point B, C, D, ... is sequentially accessed and stored in the register 406a of CPU 406.

When the readout of the required sample points and the cumulative storage of them in the register 406a are completed, the process proceeds from Step S7 to Step S10, where a particular window size is specified. The smallest window size $3 \times 3$ (N=3) is initially specified and, in the subsequent steps, larger window sizes are sequentially specified. In Step S11, the number of dots to be output within the window is calculated on the basis of the data cumulatively stored in the register 406a.

In the embodiment of the present invention, this calculation is performed, for example, in the following manner.

If the first window size is specified as $3 \times 3$ (N=3), the portion of the bit-map memory shown in FIG. 2, which corresponds to $D1A = A+B+C+D+E+F+G+H+I$, is scanned, and the number of dots to be output within this window is calculated by cumulative counting.

In Step S12, whether or not this calculated value "D1A" reaches the window size "N" is determined. If the calculated value "D1A" is below "N", the process returns to Step S10, where a window size which is the largest after the previously calculated window size is specified. Then, the processing in Step S11 is executed.

If the second window size is specified as 5×5 (N=5), the portion of the bit-map memory of FIG. 2, which corresponds to $D2A = D1A+J+K+L+M+N+O+P+Q+R+S+T+U+V+W+X+Y$, is scanned, where D1A represents the number of dots to be output which have been obtained in the above scanning. Subsequently, the above calculations are repeated until a calculated value DnA reaches the window size "N".

When the valued DnA which has been obtained in this manner exceeds "N", the process proceeds from Step S12 to Step S13, where the window size at this point in time is specified as a window size for multilevel coding. For instance, if D2A>N in the above example, the window size corresponding to D2A is 5×5. Accordingly, the window size for multilevel coding is set to 5×5.

Then, in Step S14, multilevel data on the objective pixel point is obtained by calculations. For example, if the window size is 3×3, the value obtained by dividing the aforesaid value D1A by 9 (3×3) becomes the multilevel data for the objective pixel point. If the window size is 5×5, the value obtained by dividing the aforesaid value D2A by 25 (5×5) becomes the multilevel data for the objective pixel point.

In the above-described manner, data for the desired binarized objective pixel point (for example, the "A" point) can be converted into multilevel data.

Similarly, multilevel data for the point "H" multilevel on the "A" point is obtained in the following manner. If a window size of 3×3 (N=3) is specified, the portion which corresponds to $D1H = F+G+V+W+X+I+B+C+H$ is scanned, and the number of dots to be output within this window is calculated by cumulative counting.

If a window size of 5×5 (N=5) is specified, calculations are performed on the portion which corresponds to $D2H = D1A+R+E+D+C+L+S+T+U+Q+Q'+P'+0'+N'+M'+K+J+Y$. If a data value at the time when the value of DnH thus obtained exceeds the value "N" is divided by the window size at that point in time, multilevel data on the objective pixel point "H" can be obtained.

The flow of this process is explained in detail below with reference to FIG. 5 which shows the process in diagrammatic form.

Figure 5:
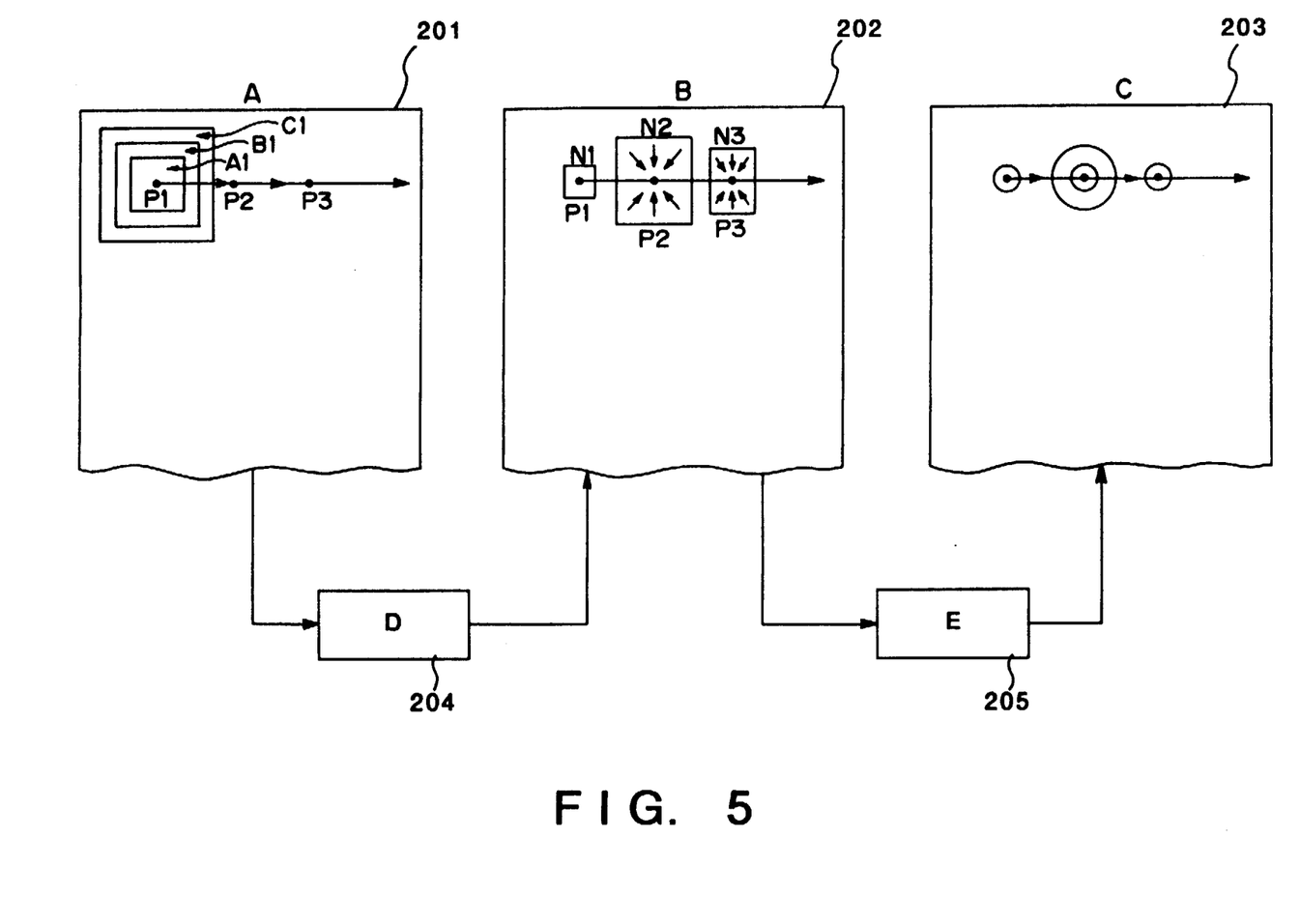
FIG. 5 is a diagrammatic view showing the flow of the process of recovering binarized data to multilevel data in the embodiment of the present invention.

In FIG. 5, reference numeral 201 denotes an image which is binarized by a density-preserving type multilevel-coding method, and P1, P2, P3, ... denote individual sample points which are selected in the binarized image for the purpose of a multilevel image.

It is assumed here that a scanning aperture corresponding to a pixel point to be output (pixel point to be printed) at the point P1 is enlarged, for example, in the order A1→B1→C1 and that the number of dots to be output in each of the scanning apertures thus enlarged is D1 for A1, D2 for B1, and D3 for C1. At this time, the data value at the time when the number "Dn" of dots to be output becomes Dn≧N (N is the integral of the window size) is obtained by the above-described process, and that data value is determined as the desired window size.

In this embodiment, the window size is determined in the above-described manner. Accordingly, if a sample point is contained in a bright portion (highlight portion) which includes few dots to be output and in which it is desired that the dots to be output be periodically positioned, the window size "N" is made large. If a sample point is contained in a dark portion which includes a large number of dots to be output and which may suffer a low-frequency moiré or a remarkable deterioration in resolution when the window size is made large, the window size "N" automatically becomes small. Accordingly, it is possible to achieve multilevel coding which provides multilevel image having high quality, high resolution, and no moiré.

Moreover, in a thin-line image portion such as a character, a symbol or the like, the value of Dn becomes large immediately (as in the case of the dark portion) the window size "N" becomes small and high resolution is achieved.

In brief, since the window size for multilevel coding is randomly determined in the above-described manner, a bright portion), a dark portion and a high-resolution image area can be continuously identified with few erroneous decisions.

At each point P2 and P3, the window size is likewise varied in the order A1→B1→C1, and a window size is obtained which corresponds to Dn≧N (Dn is the number of dots to be output within the aperture).

If the number of dots within the aperture does not reach N even though the window size reaches Nmax, which represents the upper limit of the window size at each of the points P1, P2 and P3, the multilevel data value is set to "0" (brightest portion).

In FIG. 5, D204 represents the process of controlling the steps of specifying a particular window size through the above window calculations and of setting Dn≧N.

When the above process has been completed, the multilevel coding shown in the part 202 of FIG. 5 is executed.

N1, N2 and N3 represent windows which correspond to the values "N" at the respective points P1, P2 and P3. If data on each of these points is to be converted into multilevel data, the total number of dots to be output within each of the windows N1, N2 and N3 is, as described above, divided by corresponding window areas $N1^2$, $N2^2$ and $N3^2$, and $Dn/Nn^2$, which constitutes multilevel data for each of the points, is obtained.

In other words, the value obtained by dividing "Dn", obtained when Dn has exceeded N, by the window size $Nn^2$ at this point in time is used as multilevel data.

E206 represents the above-described process of performing the function of obtaining a particular window size and calculating multilevel data from the total number of dots to be output within the obtained window size.

The resulting state of this process is shown in diagrammatic form in the part 203 of FIG. 5.

Figure 6A:
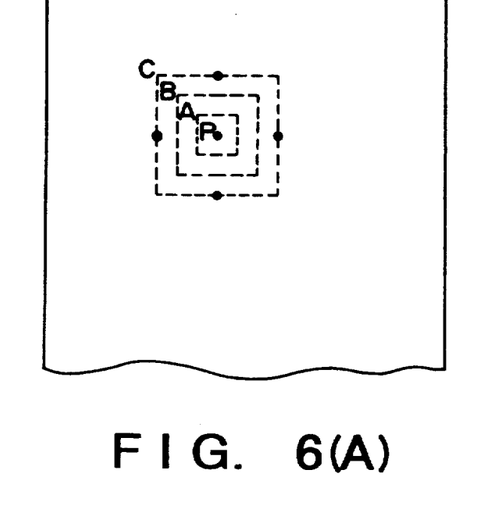
FIG. 6(A) is a view which serves to illustrate a case where a window size N is on the order of 2 to 5.

FIG. 6(A) shows the case where the window size "N" determined by the above-described process is 2 to 5 or thereabouts. It is to be understood that the case shown in this figure corresponds to the representation of a halftone image.

Figure 6B:
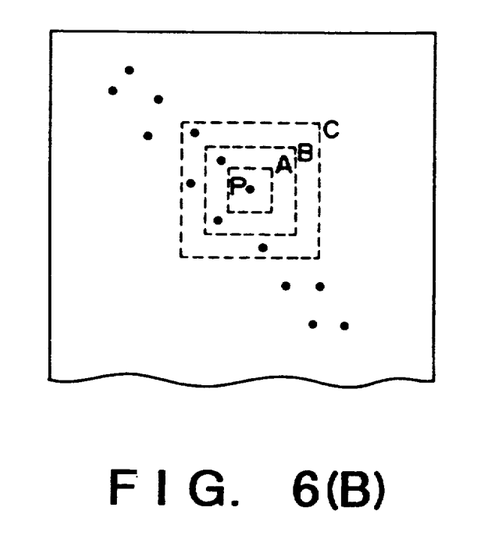

FIG. 6(B) shows an example of the representation of a line drawing such as a character, another symbol or the like.

Examples of the relationship between the window size "N" and the brightness of the image portion positioned within the window are listed below.

| "N" - | 2 ... maximum-resolution area |
| | 3 ... high-resolution area |
| | 4, 5 ... halftone middle-resolution area |
| | 6 ... halftone highlight area |
| | 7 ... highlight area |
| | 8 ... ultra-highlight area |

In this embodiment, as is evident from FIGS. 6(A) and 6(B), if the number of dots within a window of a particular window size is one or two, it is difficult to determine whether the dot is positioned in a halftone area or a high resolution area. However, if the number of dots within the window is 2-5 or more, it is possible to easily make a decision as to which one of the above-described image areas corresponds to the image within the window with a relatively small number of errors.

As described above, in accordance with this embodiment, it is possible to optimize the size of the window of a binarized image which size serves as an important factor when a density-preserving-type binarized image is to be recovered to a multilevel image, whereby it is possible to continuously identify a bright portion, a dark portion and a high-resolution image area with few errors. Accordingly, it is possible to obtain image data, binarized by a density-preserving type multilevel-coding method, from which a high-resolution image is formed with a moiré suppressed in the highlight portion of the image.

The above embodiment has been explained with reference to the example in which the decision-making window (scanning aperture) and the multilevel-coding window are each a square window. However, the present invention is not limited to the above-described window shape and, as is apparent to those skilled in the art, it can be likewise applied to a window having another configuration such as a circle, a rectangle or the like to achieve similar advantages and effects.

The method of determining the size of the decision making window has been explained with reference to the example which utilizes the number of binary dots to be output (to be printed) within the window. However, the window size may be determined by the difference between the numbers of dots within respective windows.

Moreover, in the above explanation, reference has been made to only the processing of a binarized image. However, the present invention can be likewise applied to the process of preparing a multilevel image such as a ternary image or a quarternary image as an original image and recovering it to a multilevel image of about 8 bits. It is apparent that, in this case as well, similar advantages and effects can be achieved.

As described above, in accordance with the present embodiment, binary image data (or multilevel data such as a ternary image, a quarternary image or the like) is prepared as original image data, and it can be equivalently recovered to multilevel image data of, for example, about 8 bits.

Accordingly, if the above process is appropriately carried out as required, it is possible to obtain a printout, based on high-resolution recording, which consists of binary image data or multilevel image data such as ternary image data, quarternary image data or the like. A low-resolution image with multiple steps of tone representation can be displayed as a monitor output during editing operation.

As described above, tone representation can be improved without any deterioration in resolution. Accordingly, it is possible to advantageously realize an inexpensive but high-quality display which can accommodate handling of a color document which will be widely spread in the future.

As described above, in accordance with the present invention, it is possible to optimize the size of the window of a binarized image which size serves as an important factor when a density-preserving type binarized image is to be recovered to a multilevel image, whereby it is possible to continuously make decisions as to a bright portion, a dark portion and a high-resolution image area with few errors. Accordingly, it is possible to obtain a high-resolution image which is binarized by a density-preserving type multilevel-coding method with a moiré suppressed in the highlight portion of the image.

As many widely different embodiments of the present invention will now be apparent to those skilled in the art and can be made without departing from the spirit and scope of the invention, it is to be understood that the invention is not limited to the specific embodiments described herein, but is defined in the appended claims.

What is claimed is:

1. A multilevel-coding apparatus comprising:
   supply means for supplying binary data binarized by a binarizing method of density-preserving type;
   coding means for coding the binary data supplied from said supply means into multilevel data using a window of a predetermined size; and
   determination means for determining the size of the window to be used by said coding means,
   wherein, when said determination means determines the size of the window, said determination means examines from the smallest window to larger sized windows successively to determine suitable sizes of windows for the multilevel-coding, and
   wherein said supply means supplies said coding means with the binary data included in the largest sized window of the windows which have a possibility of being determined by said determination means.

2. An apparatus according to claim 1, further comprising memory means for storing the binary data.

3. An apparatus according to claim 1, wherein the binarizing method of density-preserving type is an average-error minimizing method.

4. An apparatus according to claim 1, wherein said determination means determines the size of said window for each pixel.

5. An apparatus according to claim 1, wherein said determination means determines the suitable size of the window for multilevel-coding from among window sizes which are n×n (n≧3 and n=odd number).

6. A multilevel-coding method comprising the steps of:
   supplying binary data binarized by a binarizing method of density-preserving type; and
   coding the binary data into multilevel data using a window of a predetermined size,
   wherein, said coding step further includes the step of determining the window size for coding, and wherein, in said determining step, the size of the window is examined from the smallest size to larger sized successively to determine suitable sizes of windows to be subjected to multilevel-coding, and wherein, in said supplying step, the binary data included in the largest sized window of the windows which have a possibility of being determined in said determining step are supplied.

7. A method according to claim 6, wherein the binary data is stored in memory means.

8. A method according to claim 6, wherein the binarizing method of density-preserving type is an average-error minimizing method.

9. A method according to claim 6, wherein the window size is determined for each pixel.

10. A method according to claim 6, wherein the suitable window size is determined from among window sizes which are $n \times n$ ($n \geq 3$ and $n =$ odd number).

* * * * *

UNITED STATES PATENT AND TRADEMARK OFFICE
CERTIFICATE OF CORRECTION

PATENT NO. : 5,140,441
DATED     : August 18, 1992
INVENTOR(S) : SUSUMU SUGIURA, ET AL.

It is certified that error appears in the above-identified patent and that said Letters Patent is hereby corrected as shown below:

COLUMN 4

Line 23, "int he" should read --in the--.

COLUMN 8

Line 66, "sized" should read --sizes--.

Signed and Sealed this

Thirty-first Day of August, 1993

Attest:

BRUCE LEHMAN

Attesting Officer

Commissioner of Patents and Trademarks